US012718013B2

(12) United States Patent
Park et al.

(10) Patent No.: US 12,718,013 B2
(45) Date of Patent: Aug. 25, 2026

(54) METHOD AND ELECTRONIC DEVICE FOR PROCESSING USER UTTERANCE INTENT AMBIGUITY BASED ON LANGUAGE MODELS

(71) Applicant: SAMSUNG ELECTRONICS CO., LTD., Suwon-si (KR)

(72) Inventors: Sangmin Park, Suwon-si (KR); Kyungtae Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 272 days.

(21) Appl. No.: 18/407,347

(22) Filed: Jan. 8, 2024

(65) Prior Publication Data

US 2024/0143920 A1 May 2, 2024

Related U.S. Application Data

(63) Continuation of application No. PCT/KR2023/011011, filed on Jul. 28, 2023.

(30) Foreign Application Priority Data

Aug. 5, 2022 (KR) ........................ 10-2022-0098095
Sep. 7, 2022 (KR) ........................ 10-2022-0113527

(51) Int. Cl.
*G06F 40/30* (2020.01)
*G06F 40/20* (2020.01)
(Continued)

(52) U.S. Cl.
CPC ............ *G06F 40/226* (2020.01); *G10L 15/26* (2013.01)

(58) Field of Classification Search
CPC ................................ G10L 15/22; G10L 15/26
See application file for complete search history.

(56) References Cited

U.S. PATENT DOCUMENTS 9,324,323 B1 * 4/2016 Bikel .................... G10L 15/197
11,211,058 B1 * 12/2021 Eakin .................... G10L 15/197
(Continued)

FOREIGN PATENT DOCUMENTS

KR 20080005745 A 1/2008
KR 20100075451 A 7/2010
(Continued)

OTHER PUBLICATIONS

International Search Report and Written Opinion for International Application No. PCT/KR2023/011011; International Filing Date Jul. 28, 2023, Date of Mailing Oct. 24, 2023; 3Pages.

*Primary Examiner* — Jialong He
(74) *Attorney, Agent, or Firm* — CANTOR COLBURN LLP

(57) ABSTRACT

An electronic device includes a memory including instructions and a processor electrically connected to the memory and configured to execute the instructions. When the instructions are executed by the processor, the processor is configured to convert an utterance into text data. The processor is configured to obtain a plurality of ambiguity index values from the text data based on each of a plurality of ambiguity verification modules including a language model. The processor is configured to provide a response to a user based on the plurality of ambiguity index values.

16 Claims, 10 Drawing Sheets

(51) Int. Cl.
*G06F 40/226* (2020.01)
*G10L 15/26* (2006.01)

(56) References Cited

U.S. PATENT DOCUMENTS

| | | | | |
|---|---|---|---|---|
| 2011/0288868 | A1* | 11/2011 | Lloyd | G10L 15/22<br>704/E15.001 |
| 2012/0265528 | A1* | 10/2012 | Gruber | G10L 15/183<br>704/235 |
| 2019/0236204 | A1* | 8/2019 | Canim | G10L 15/1815 |
| 2020/0380077 | A1 | 12/2020 | Ge et al. | |

FOREIGN PATENT DOCUMENTS

| | | | |
|---|---|---|---|
| KR | 20110017129 | A | 2/2011 |
| KR | 20130000423 | A | 1/2013 |
| KR | 20130018205 | A | 2/2013 |
| KR | 101667006 | B1 | 10/2016 |
| KR | 101741734 | B1 | 6/2017 |
| KR | 20180072845 | A | 6/2018 |
| KR | 20190122457 | A | 10/2019 |
| KR | 102198265 | B1 | 1/2021 |
| KR | 102281515 | B1 | 7/2021 |

* cited by examiner

METHOD AND ELECTRONIC DEVICE FOR PROCESSING USER UTTERANCE INTENT AMBIGUITY BASED ON LANGUAGE MODELS

CROSS-REFERENCE TO RELATED APPLICATIONS

This application is a continuation application of International Application No. PCT/KR2023/011011 designating the United States, filed on Jul. 28, 2023, in the Korean Intellectual Property Receiving Office and claiming priority to Korean Patent Application No. 10-2022-0098095, filed on Aug. 5, 2022 and Korean Patent Application No. 10-2022-0113527, filed on Sep. 7, 2022, in the Korean Intellectual Property Office, the disclosures of which are incorporated by reference herein in their entireties.

BACKGROUND

1. Field

The disclosure relates to a method and electronic device for processing a user utterance based on a language model.

2. Description of Related Art

Electronic devices including a voice assistant function that provides a service based on user utterance are widely distributed. An electronic device may attempt to recognize the user utterance through an artificial intelligence (AI) server and may attempt to figure out the meaning and intent of the user utterance. The AI server may interpret an utterance of a user, may infer the intent of the user, and may perform operations based on the inferred intent. The AI server may perform an operation based on the user intent expressed through a natural language interaction between the user and the AI server.

An operation of classifying user intent for the AI server to perform an operation may be performed using a neural network-based model. The neural network-based model may require a large volume of training utterances.

SUMMARY

According to an embodiment, an electronic device includes a memory including instructions and a processor electrically connected to the memory and configured to execute the instructions. When the instructions are executed by the processor, the processor is configured to convert an utterance into text data. The processor is configured to obtain a plurality of ambiguity index values from the text data based on each of a plurality of ambiguity verification modules including a language model. The processor is configured to provide a response to a user based on the plurality of ambiguity index values.

According to an embodiment, a method of operating an electronic device includes converting an utterance into text data. The method includes obtaining a plurality of ambiguity index values from the text data based on each of a plurality of ambiguity verification modules including a language model. The method includes providing a response to a user based on the plurality of ambiguity index values.

According to an embodiment, an electronic device includes a memory including instructions and a processor electrically connected to the memory and configured to execute the instructions. When the instructions are executed by the processor, the processor is configured to convert an utterance into text data. The processor is configured to obtain an ambiguity index value from the text data based on an ambiguity verification module including a general language model. The processor is configured to provide a response to a user based on the ambiguity index value.

According to an embodiment, a method of operating an electronic device includes converting an utterance into text data. The method includes obtaining an ambiguity index value from the text data based on an ambiguity verification module including a general language model. The method includes providing a response to a user based on the ambiguity index value.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
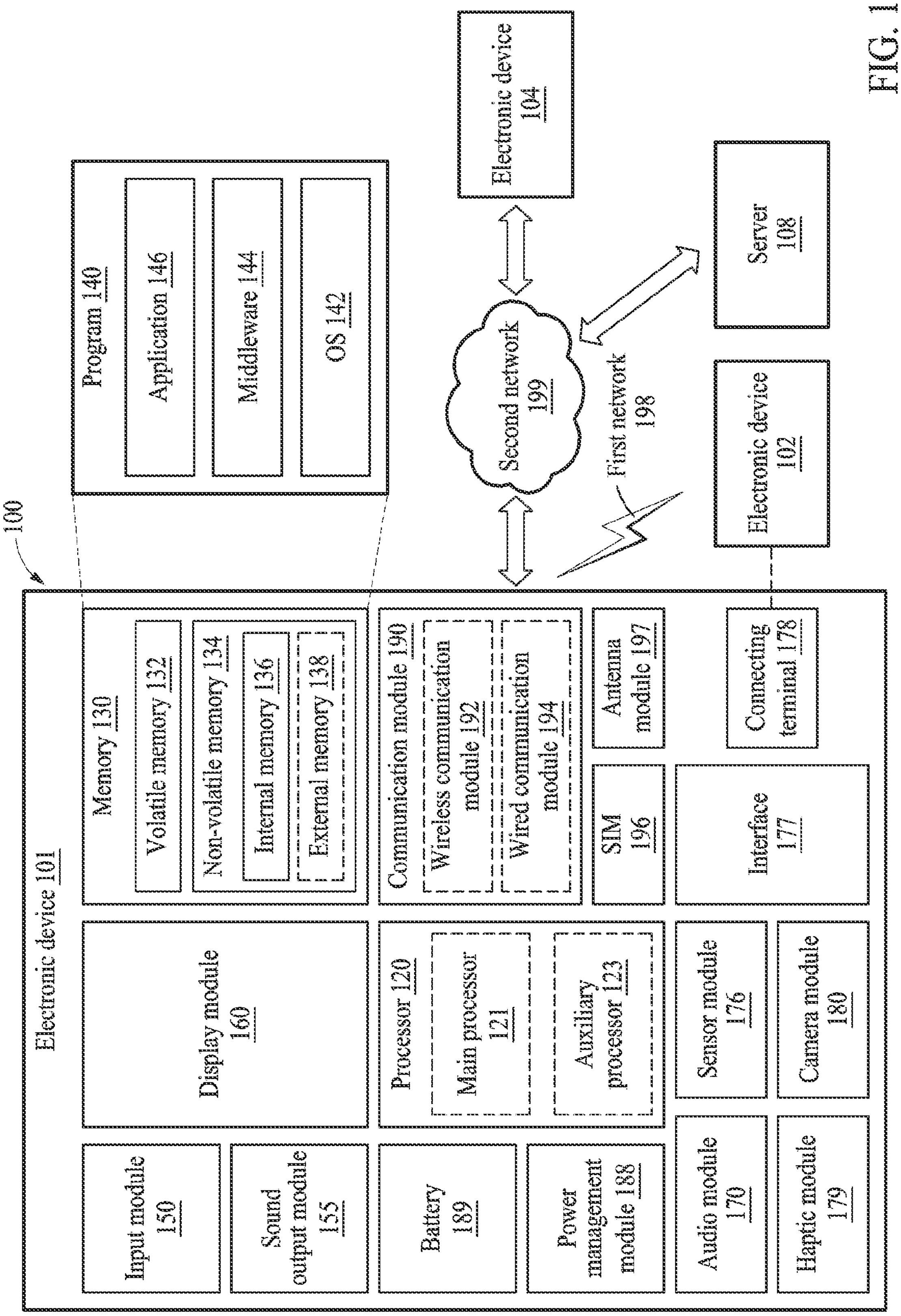
FIG. 1 is a block diagram illustrating an electronic device in a network environment according to an embodiment.

Hereinafter, embodiments will be described in detail with reference to the accompanying drawings. When describing the examples with reference to the accompanying drawings, like reference numerals refer to like components and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electrical signal or vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
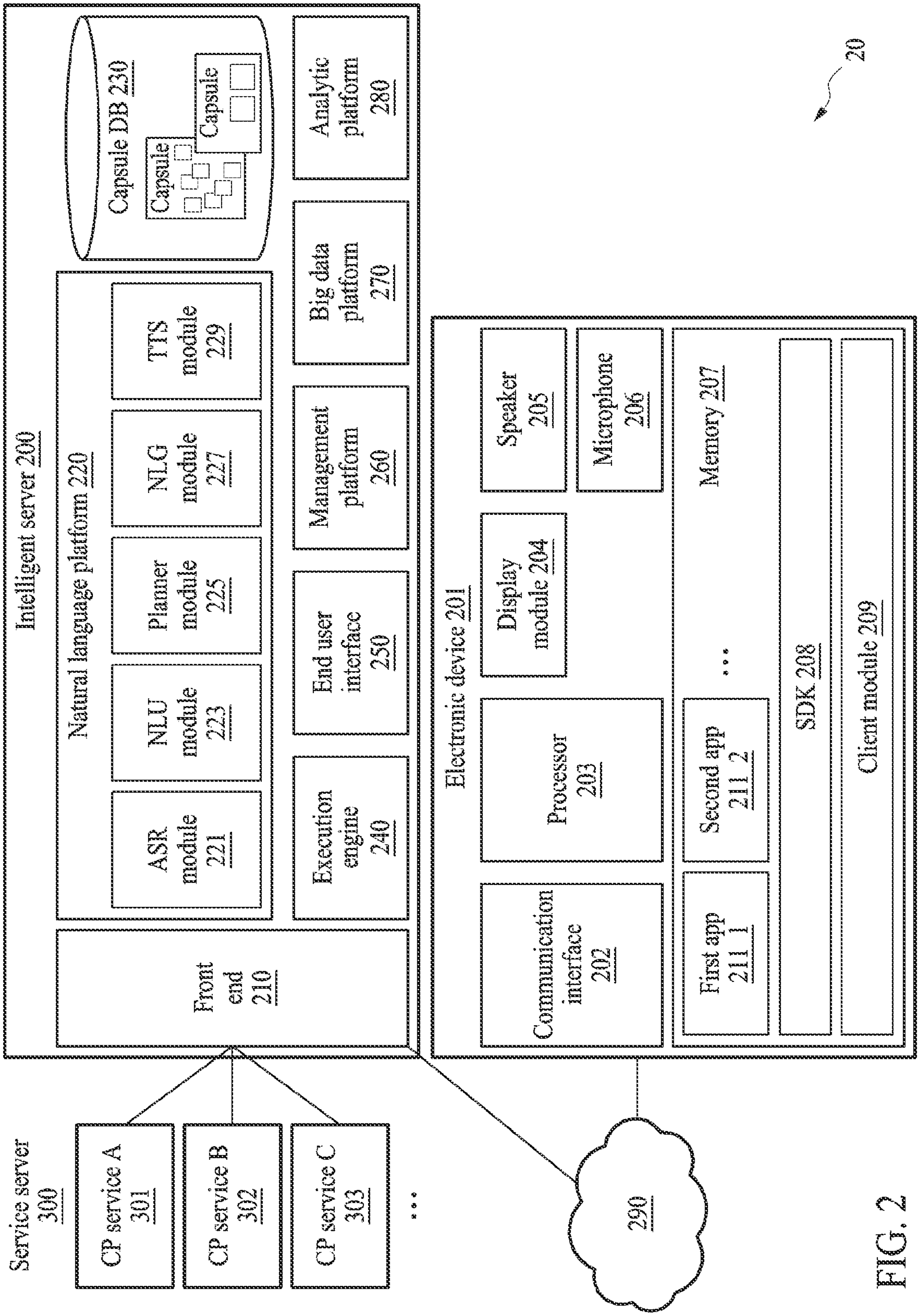
FIG. 2 is a block diagram illustrating an integrated intelligence system according to an embodiment.

Referring to FIG. 2, an integrated intelligence system 20 according to an embodiment may include an electronic device 201 (e.g., the electronic device 101 of FIG. 1), an intelligent server 200 (e.g., the server 108 of FIG. 1), and a service server 300 (e.g., the server 108 of FIG. 1).

The electronic device 201 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device and configured to transmit and receive data to and from the external device. The microphone 206 may receive a sound (e.g., a user utterance) and convert the sound into an electrical signal. The speaker 205 may output the electrical signal as a sound (e.g., a speech).

The display module 204 may be configured to display an image or video. The display module 204 may also display a graphical user interface (GUI) of an app (or an application program) being executed. The display module 204 may receive a touch input through a touch sensor. For example, the display module 204 may receive a text input through a touch sensor in an on-screen keyboard area displayed through the display module 204.

The memory 207 may store a client module 209, a software development kit (SDK) 208, and a plurality of apps 211. The client module 209 and the SDK 208 may configure a framework (or a solution program) for performing general-purpose functions. In addition, the client module 209 or the SDK 208 may configure a framework for processing a user input (e.g., a voice input, a text input, or a touch input).

The plurality of apps 211 stored in the memory 207 may be programs for performing designated functions. The plurality of apps 211 may include a first app 211_1 and a second app 211_2. Each of the plurality of apps 211 may include a plurality of actions for performing a designated function. For example, the apps may include an alarm app, a messaging app, and/or a scheduling app. The plurality of apps 211 may be executed by the processor 203 to sequentially execute at least a portion of the plurality of actions.

The processor 203 may control the overall operation of the electronic device 201. For example, the processor 203 may be electrically connected to the communication interface 202, the microphone 206, the speaker 205, and the display module 204 to perform a designated operation.

The processor 203 may also perform the designated function by executing the program stored in the memory 207. For example, the processor 203 may execute at least one of the client module 209 or the SDK 208 to perform the following operation for processing a user input. The processor 203 may control the operation of the plurality of apps 211 through, for example, the SDK 208. The following operation which is the operation of the client module 209 or the SDK 208 may be performed by the processor 203.

The client module 209 may receive a user input. For example, the client module 209 may receive a voice signal corresponding to a user utterance sensed through the microphone 206. As another example, the client module 209 may receive a touch input sensed through the display module 204. As still another example, the client module 209 may receive a text input sensed through a keyboard or an on-screen keyboard. In addition, the client module 209 may receive various types of user inputs sensed through an input module included in the electronic device 201 or an input module connected to the electronic device 201. The client module 209 may transmit the received user input to the intelligent server 200. The client module 209 may transmit state information of the electronic device 201 together with the received user input to the intelligent server 200. The state information may be, for example, execution state information of an app.

The client module 209 may receive a result corresponding to the received user input. For example, when the intelligent server 200 is capable of calculating a result corresponding to the received user input, the client module 209 may receive the result corresponding to the received user input. The client module 209 may display the received result on the display module 204. Further, the client module 209 may output the received result in an audio form through the speaker 205.

The client module 209 may receive a plan corresponding to the received user input. The client module 209 may display results of executing a plurality of actions of an app according to the plan on the display module 204. For example, the client module 209 may sequentially display the results of executing the plurality of actions on the display module 204 and output the results in an audio form through the speaker 205. As another example, the electronic device 201 may display only a portion of the results of executing the plurality of actions (e.g., a result of the last action) on the display module 204 and output the portion of the results in an audio form through the speaker 205.

According to one embodiment, the client module 209 may receive a request for obtaining information necessary for calculating a result corresponding to the user input from the intelligent server 200. According to one embodiment, the client module 209 may transmit the necessary information to the intelligent server 200 in response to the request.

The client module 209 may transmit information on the results of executing the plurality of actions according to the plan to the intelligent server 200. The intelligent server 200 may confirm that the received user input has been correctly processed using the information on the results.

The client module 209 may include a speech recognition module. According to one embodiment, the client module 209 may recognize a voice input for performing a limited function through the speech recognition module. For example, the client module 209 may execute an intelligent app for processing a voice input to perform an organic operation through a designated input (e.g., Wake up!).

The intelligent server 200 may receive information related to a user voice input from the electronic device 201 through a communication network 290. According to one embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligence (AI) system. The artificial intelligence system may be a rule-based system or a neural network-based system (e.g., a feedforward neural network (FNN) or a recurrent neural network (RNN)). Alternatively, the artificial intelligence system may be a combination thereof or other artificial intelligence systems. According to an example embodiment, the plan may be selected from a set of predefined plans or may be generated in real time in response to a user request. For example, the AI system may select at least one plan from among the predefined plans.

The intelligent server 200 may transmit a result according to the generated plan to the electronic device 201 or transmit the generated plan to the electronic device 201. According to one embodiment, the electronic device 201 may display the result according to the plan on the display module 204. According to one embodiment, the electronic device 201 may display a result of executing an action according to the plan on the display module 204.

The intelligent server 200 may include a front end 210, a natural language platform 220, a capsule database (DB) 230, an execution engine 240, an end user interface 250, a management platform 260, a big data platform 270, and/or an analytic platform 280.

The front end 210 may receive the received user input from the electronic device 201. The front end 210 may transmit a response corresponding to the user input.

According to an example embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert data related to the voice input received from the electronic device 201 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent. The term "word", as used herein, can refer to a single word or a plurality of words (e.g., a phrase). The NLU module 223 may obtain intent information corresponding to the user utterance. The intent information may be information indicating an intention of the user determined through an analysis of the text data. The intent information may include information indicating an action or function that the user intends to execute using a device.

The planner module 225 may generate a plan using a parameter and the intent determined by the NLU module 223. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) on connections between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a speech form.

According to one embodiment, some or all of the functions of the natural language platform 220 may be implemented in the electronic device 201 as well.

The capsule DB 230 may store information on the relationship between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to an embodiment, the capsule DB 230 may include a follow-up registry that stores information on follow-up actions for suggesting a follow-up action to the user in a designated situation. The follow-up action may include, for example, a follow-up utterance. According to one embodiment, the capsule DB 230 may include a layout registry that stores layout information that is information output through the electronic device 201. According to one embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In one embodiment, the capsule DB 230 may be implemented in the electronic device 201 as well.

The execution engine 240 may calculate a result using the generated plan. The end user interface 250 may transmit the calculated result to the electronic device 201. Accordingly, the electronic device 201 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 201. According to one embodiment, the service server 300 may be a server operated by a third party. Services, such as CP service A 301, CP service B 302, CP service C 303, and others of the service server 300 can interface with the front end 210 of the intelligent server 200, for example. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the integrated intelligence system 20 described above, the electronic device 201 may provide various intelligent services to the user in response to a user input. The user input may include, for example, an input through a physical button, a touch input, or a voice input.

In one embodiment, the electronic device 201 may provide a speech recognition service through an intelligent app (or a speech recognition app) stored therein. In this case, for example, the electronic device 201 may recognize a user utterance or a voice input received through the microphone, and provide a service corresponding to the recognized voice input to the user.

In one embodiment, the electronic device 201 may perform a designated action alone or together with the intelligent server and/or a service server, based on the received voice input. For example, the electronic device 201 may execute an app corresponding to the received voice input and perform a designated action through the executed app.

In one embodiment, when the electronic device 201 provides a service together with the intelligent server 200 and/or the service server 300, the electronic device 201 may detect a user utterance using the microphone 206 and generate a signal (or voice data) corresponding to the detected user utterance. The electronic device 201 may transmit the voice data to the intelligent server 200 using the communication interface 202.

The intelligent server 200 may generate, as a response to the voice input received from the electronic device 201, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
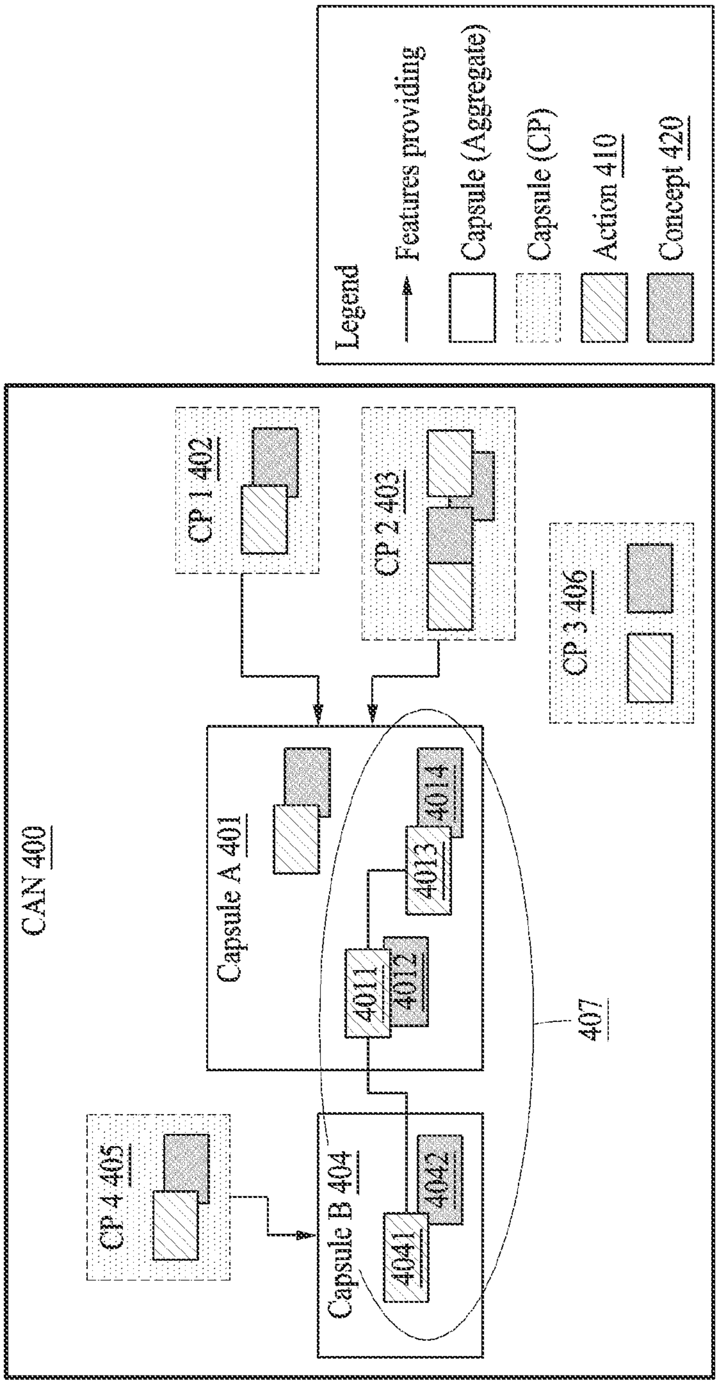
FIG. 3 is a diagram illustrating a form in which relationship information between concepts and actions is stored in a database according to an embodiment.

FIG. 3 is a diagram illustrating a form in which relationship information between concepts and actions is stored in a database according to various example embodiments.

A capsule DB (e.g., the capsule DB 230 of FIG. 2) of the intelligent server (e.g., the intelligent server 200 of FIG. 2) may store capsules in the form of a CAN 400. The capsule DB may store an action for processing a task corresponding to a voice input of a user and a parameter required for the action in the form of a CAN.

The capsule DB may store a plurality of capsules (a capsule A 401 and a capsule B 404) respectively corresponding to a plurality of domains (e.g., applications). According to an embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an embodiment, one capsule may include at least one action 410 for performing a designated function and at least one concept 420. The CAN 400 can store other information, such as CP 3 406. Further, capsule B 404 may receive input from CP 4 405 of another service.

A natural language platform (e.g., the natural language platform 220 of FIG. 2) may generate a plan for performing a task corresponding to the received speech input using the capsules stored in the capsule DB. For example, a planner module (e.g., the planner module 225 of FIG. 2) of the natural language platform may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
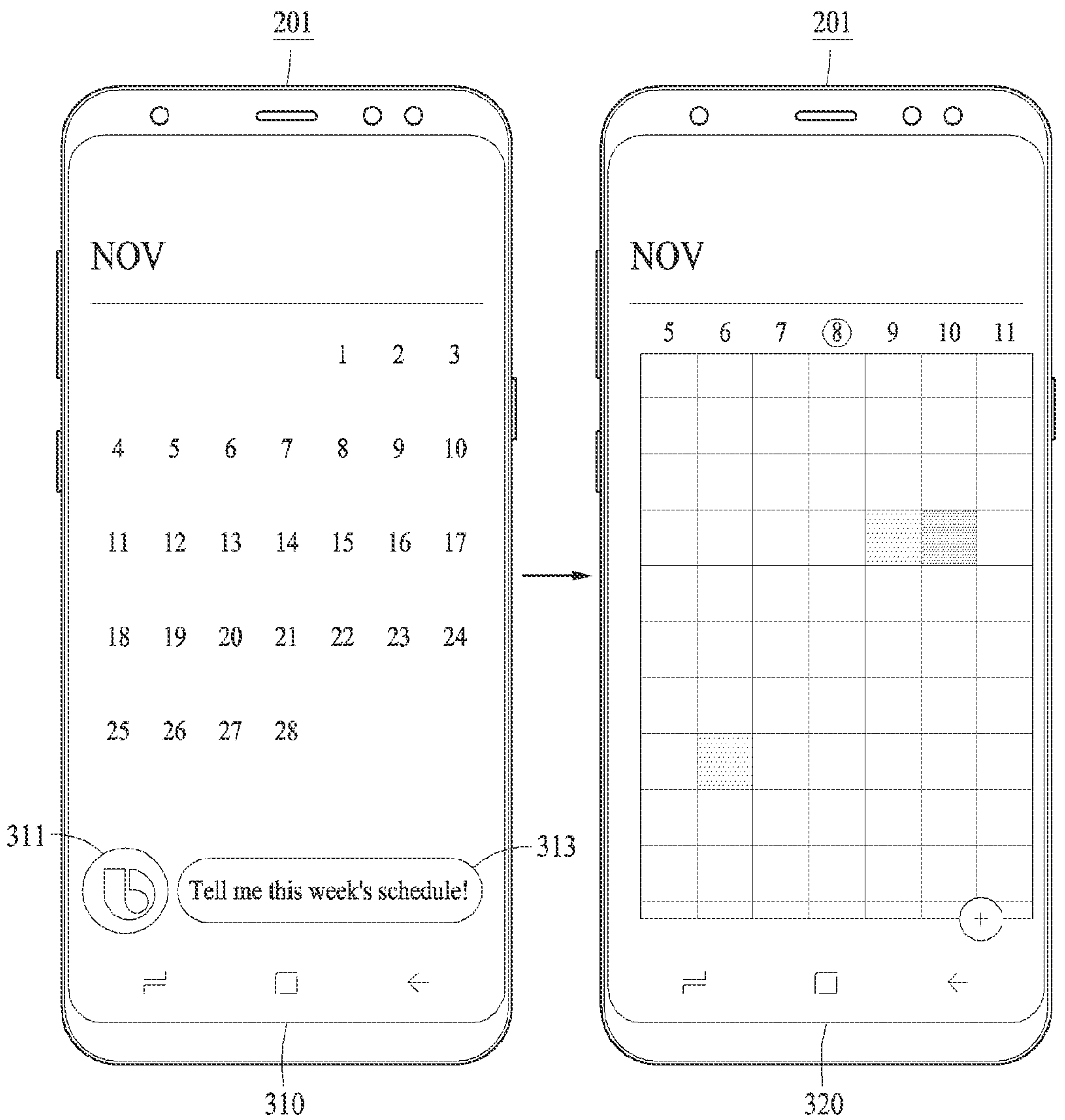
FIG. 4 is a diagram illustrating a screen of an electronic device processing a received voice input through an intelligent app according to an embodiment.

FIG. 4 is a diagram illustrating a screen of an electronic device processing a received voice input through an intelligent app according to various example embodiments.

An electronic device 201 may execute an intelligent app to process a user input through an intelligent server (e.g., the intelligent server 200 of FIG. 2).

According to one embodiment, on a screen 310, when a designated voice input (e.g., Wake up!) is recognized or an input through a hardware key (e.g., a dedicated hardware key) is received, the electronic device 201 may execute an intelligent app for processing the voice input. The electronic device 201 may execute the intelligent app, for example, in a state in which a scheduling app is executed. According to an embodiment, the electronic device 201 may display an object (e.g., an icon) 311 corresponding to the intelligent app on the display module 204 (e.g., the display module 160 of FIG. 1 and the display module 204 of FIG. 2). According to one embodiment, the electronic device 201 may receive a voice input by a user utterance. For example, the electronic device 201 may receive a voice input of "Tell me this weeks schedule!". According to one embodiment, the electronic device 201 may display a user interface (UI) 313 (e.g., an input window) of the intelligent app in which text data of the received voice input is displayed on the display module 204.

According to one embodiment, on a screen 320, the electronic device 201 may display a result corresponding to the received voice input on the display module 204. For example, the electronic device 201 may receive a plan corresponding to the received user input, and display "this week's schedule" on the display module 204 according to the plan.

Figure 5:
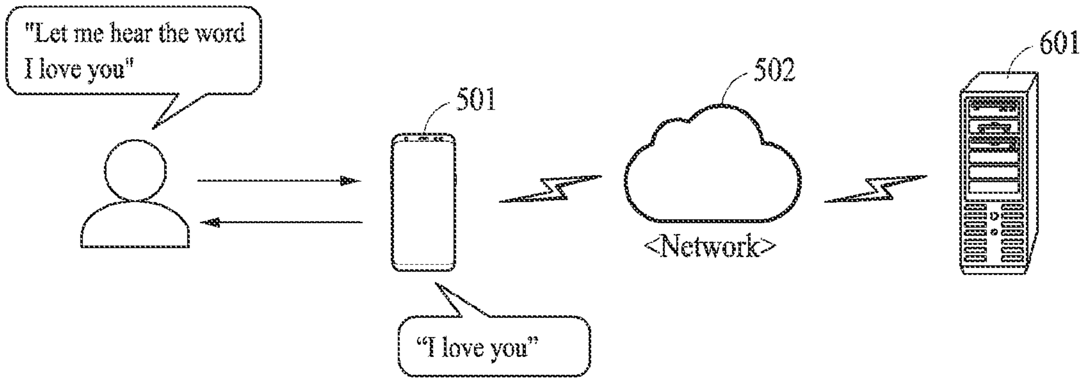
FIG. 5 is a diagram illustrating an operation of an electronic device to process an utterance of a user according to an embodiment.

FIG. 5 is a diagram illustrating an operation of an electronic device to process an utterance of a user according to an embodiment.

Referring to FIG. 5, in an embodiment, an electronic device 501 may include at least some components of the electronic device 101 described with reference to FIG. 1 and the electronic device 201 described with reference to FIG. 2. An intelligent server 601 may include at least some components of the intelligent server 200 described with reference to FIG. 2. With respect to the electronic device 501 and the intelligent server 601, repeated descriptions provided with reference to FIGS. 1 to 4 are omitted.

The electronic device 501 (e.g., the electronic device 101 of FIG. 1 or the electronic device 201 of FIG. 2) may be connected to the intelligent server 601 (e.g., the intelligent server 200 of FIG. 2) via a network 502, such as a LAN, a WAN, a value added network (VAN), a mobile radio communication network, a satellite communication network, or any combination thereof. The electronic device 501 and the intelligent server 601 may communicate with each other through a wired communication method or a wireless communication method (e.g., a wireless LAN (e.g., Wi-Fi), Bluetooth, Bluetooth low energy, ZigBee, Wi-Fi direct (WFD), ultra wideband (UWB), IrDA, and near field communication (NFC)).

In an embodiment, the electronic device 501 may be implemented as at least one of smartphones, tablet personal computers (PCs), mobile phones, speakers (e.g., artificial intelligence (AI) speakers), video phones, e-book readers, desktop PCs, laptop PCs, netbook computers, workstations, servers, PDAs, portable multimedia players (PMPs), MP3 players, mobile medical devices, cameras, or wearable devices.

In an embodiment, the electronic device 501 may obtain a voice signal corresponding to an utterance of a user and may transmit the voice signal to the intelligent server 601. The intelligent server 601 may obtain text data corresponding to the utterance of the user based on the voice signal. The text data may be obtained by converting a voice part into computer-readable text by performing ASR on the voice signal. The intelligent server 601 may analyze the utterance of the user using the text data. The intelligent server 601 may perform a required function using an analysis result (e.g., intent information, an entity, and/or a capsule) or may provide a response (e.g., a question and an answer) to be provided to a user to a device (e.g., the electronic device 501). The intelligent server 601 may be implemented as software. Some or all of the intelligent server 601 may be implemented in the electronic device 501 and/or the intelligent server 601 (e.g., the intelligent server 200 of FIG. 2). On-device AI for processing an utterance without communication with the intelligent server 601 may be installed on the electronic device 501. Components, such as the natural language platform 220 described with reference to FIGS. 2 to 4, may be implemented in the electronic device 501.

In an embodiment, the electronic device 501 may verify ambiguity of an utterance. The electronic device 501 may detect an utterance that may be classified as a chit-chat utterance or a task-oriented utterance. The chit-chat utterance may be based on a dialogue (e.g., an open domain dialogue) used by a chatbot. The task-oriented utterance may be based on a dialogue (e.g., a task-oriented dialogue) for an operation (or a function) that a user desires to execute using a device. The chit-chat utterance may be an utterance processed by a chatbot domain implemented in a natural language platform (e.g., the natural language platform 220 of FIG. 2). The task-oriented utterance may be utterance processed by another domain (e.g., a domain that is not a chatbot) in the natural language platform 220. The domain may be a region (or a category) associated with an operation (or a function) that a user desires to execute using a device. The domain (e.g., an application) may be classified based on a service related to text. The domain may be associated with intent information corresponding to text.

Figure 6:
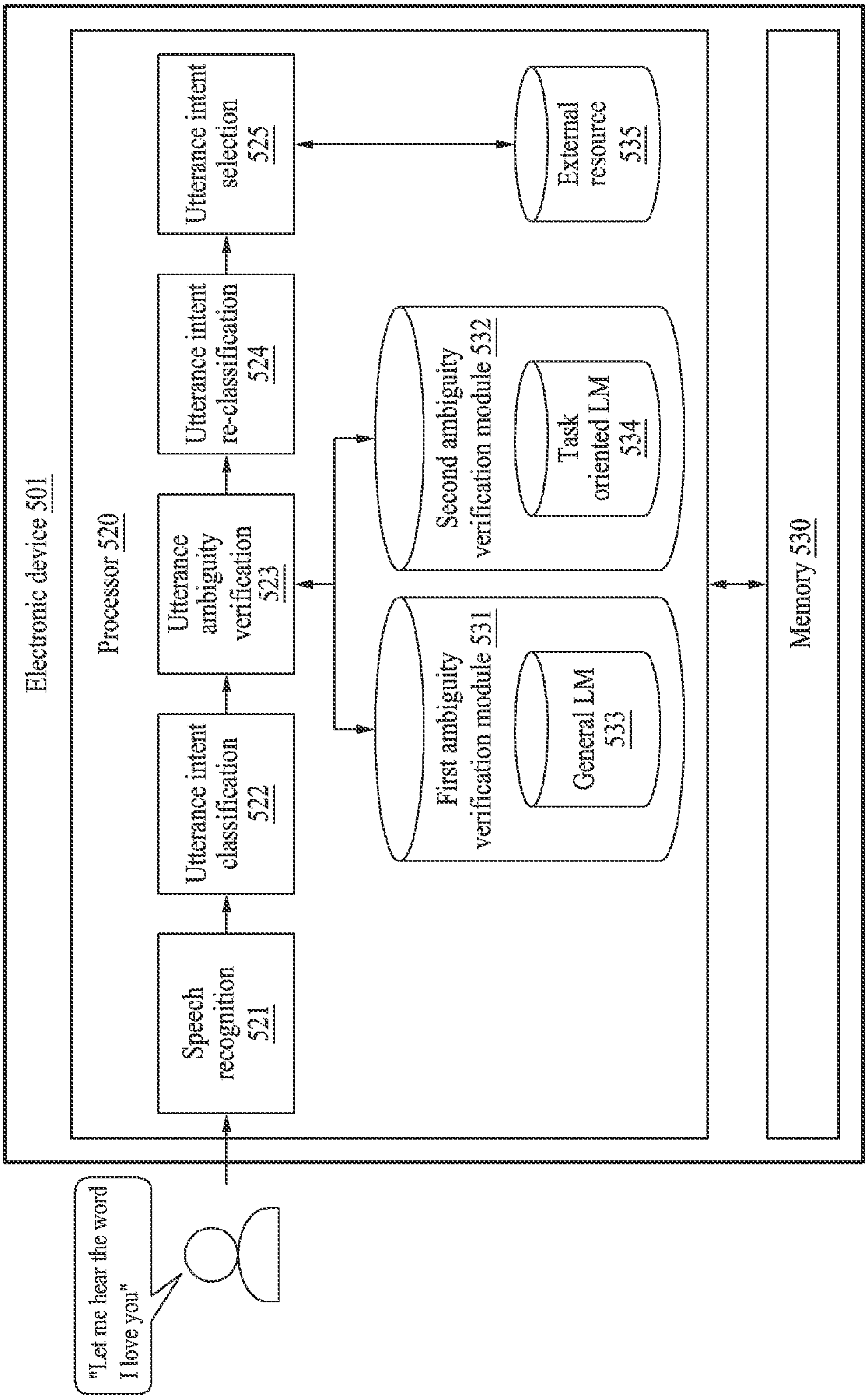
FIG. 6 is a schematic block diagram of an electronic device according to an embodiment.

In an embodiment, the electronic device 501 may use a language model (LM) (e.g., a general LM 533 and/or a task-oriented LM 534 of FIG. 6). The electronic device 501 may verify ambiguity of an utterance through an LM (e.g., the general LM 533 and/or the task-oriented LM 534 of FIG. 6). The electronic device 501 may perform intent classification on the utterance (e.g., a user utterance converted into text data) through an LM (not illustrated). Training data of an LM used for utterance intent classification may be different from training data of an LM used for utterance ambiguity verification. The LM may represent a characteristic of a language and may assign a probability value to a component (e.g., a letter, a morpheme, and a word) constituting the language. The LM may be modeled based on a neural network. The LM may be used as a component of various modules (e.g., the ASR module 221 of FIG. 2 and the NLU module 223 of FIG. 2) in the natural language platform 220. For example, the LM may be used as a component of the NLU module 223 for determining a domain (e.g., a domain for processing an utterance) corresponding to an utterance. Compared to an NLU module that does not include an LM, the NLU module 223 including the LM may obtain high determination performance with a small number of input-output data sets, may increase the convergence speed of training, and may have high determination performance with respect to an utterance that is not included in a data set.

Referring to FIG. 5, in an embodiment, the electronic device 501 may receive an utterance (e.g., "Let me hear the word I love you", "Let me hear the words I love you", etc.). The utterance may include an ambiguous meaning. The utterance (e.g., "Let me hear the word I love you") may be a task-oriented utterance that implies a request to play a song, "The Word I Love You". The utterance (e.g., "Let me hear the word I love you") may be a chit-chat utterance that implies a request to a chatbot to say "I love you". The electronic device 501 may detect ambiguity of an utterance through an LM (e.g., the general LM 533 and/or the task-oriented LM 534 of FIG. 6). The electronic device 501 may appropriately provide a response (e.g., "I love you") corresponding to the ambiguous utterance based on the LM.

In an embodiment, the electronic device 501 may use an LM. The electronic device 501 may use not only an LM for generating an utterance but also an LM for verifying a generated utterance. The electronic device 501 may efficiently verify ambiguity of an utterance (e.g., a user utterance) using the LM. The electronic device 501 may detect ambiguity of an utterance without using a predefined list (e.g., an allow list and a deny list). In an embodiment, a method of using a predefined list may record an ambiguous utterance in a deny when a response is not available, in response to the ambiguous utterance (e.g., "Let me hear the word I love you"), and may solve a problem through exception handling for the ambiguous utterance. The method of using a predefined list may need to manage an allow list and/or a deny list, may have a difficulty in updating the list based on an update, and may respond to an ambiguous utterance through post-processing. The electronic device 501 in an embodiment may respond to an utterance without the need to manage a list by using the LM. The electronic device 501 may not need to add an ambiguous utterance to a list and may immediately respond to the ambiguous utterance upon receiving the ambiguous utterance.

In an embodiment, the electronic device 501 may verify ambiguity of a user utterance after performing intent classification (e.g., obtain intent information corresponding to the user utterance) on the user utterance. A first system (e.g., the natural language platform 220 or the NLU module 223 of FIG. 2) for performing intent classification on a user utterance and a second system for verifying ambiguity of a user utterance may be implemented in the electronic device 501. The first system and the second system may be iteratively updated at different times. The LM included in the second system may be implemented in various capacities depending on an implementation method (e.g., implemented in a server, implemented in a terminal) of the second system. The electronic device (or the intelligent server 601) 501 in which the first system is integrated with the second system may be a system in which a classification operation is integrated with a verification operation. The first system and the second system may be combined and trained, such as a generator and a discriminator of a generative adversarial network (GAN).

In an embodiment, the first system and the second system may include LMs, respectively. The purpose of use of the LM of the first system may be different from that of the second system. The first system may use an LM (not illustrated) for classifying an utterance intent. In addition, the first system may use an LM (not illustrated) for generating training data of an utterance intent classification module. The second system may use an LM (e.g., the general LM 533 and/or the task-oriented LM 534 of FIG. 6) for verifying ambiguity of a user utterance. To determine whether a user utterance input to the LM of the second system is similar to a chit-chat utterance and/or a task-oriented utterance, the second system may use the LM. The training data of the LM (not illustrated) included in the first system may be different from the LM (e.g., the general LM 533 and/or the task-oriented LM 534 of FIG. 6) included in the second system. The LM of the first system may be configured by training data of a designated domain. The LM of the second system may frequently change depending on crawled data and/or a trend. The LM of the second system may be iteratively updated at a more frequent cycle compared to the LM of the first system. The electronic device 501 may differently set an update cycle of the first system and an update cycle of the second system by separately configuring the first system for performing intent classification on a user utterance and the second system for verifying ambiguity of a user utterance. The electronic device 501 may operate an efficient system by differently setting the update cycle of the first system and the update cycle of the second system. In addition, the electronic device 501 may not separately configure the first system and the second system and may configure the first system and the second system as a single system and process a user utterance.

In an embodiment, some or all operations performed by the electronic device 501 may be performed by the electronic device 501 and/or the intelligent server 601. Hereinafter, a description is provided based on the assumption that the electronic device 501 performs.

FIG. 6 is a schematic block diagram of an electronic device according to an embodiment.

Referring to FIG. 6, in an embodiment, the electronic device 501 may include at least some components of the electronic device 101 described with reference to FIG. 1 and the electronic device 201 described with reference to FIG. 2. As described above, on-device AI for processing an utterance without communication with an intelligent server (e.g., the intelligent server 200 of FIG. 2 and the intelligent server 601 of FIG. 5) may be installed on the electronic device 501. The natural language platform 220 described with reference to FIGS. 2 to 4 may be implemented in the electronic device 501. With respect to the electronic device 501, repeated descriptions provided with reference to FIGS. 1 to 4 are omitted. The electronic device 501 may include a processor 520 (e.g., the processor 120 of FIG. 1 and the processor 203 of FIG. 2) and a memory 530 (e.g., the memory 130 of FIG. 1 and the memory 207 of FIG. 2) electrically connected to the processor 520. The processor 520 (e.g., an application processor) may execute instructions by accessing the memory 530. The processor 520 may perform an operation for providing a response to a user. The memory 530 may store a variety of data used by at least one component (e.g., the processor 520) of the electronic device 501.

In an embodiment, it may be understood that operations 521 to 525 are performed by the processor 520 of the electronic device 501. Operations to be described hereinafter may be sequentially performed but not necessarily. For example, the order of the operations may change, and at least two of the operations may be performed in parallel.

In an embodiment, in operation 521, the processor 520 may perform speech recognition. The processor 520 may convert data (e.g., a voice signal) related to a voice input (e.g., "Let me hear the word I love you") received from the electronic device 501 into text data. As the on-device AI is installed on the electronic device 501, an ASR module (e.g., the ASR module 221 of FIG. 2) may be implemented in the electronic device 501.

In an embodiment, in operation 522, the processor 520 may perform intent classification on an utterance (e.g., a user utterance converted into text data). The processor 520 may obtain first intent information corresponding to the user utterance. The intent information may be information indicating an intention of the user determined through an analysis of the text data. The intent information may include information indicating an action or function that the user intends to execute using a device. As the on-device AI is installed on the electronic device 501, a module (e.g., the NLU module 223 of FIG. 2) for obtaining intent information may be implemented in the electronic device 501. The module (e.g., the NLU module 223 of FIG. 2) for obtaining intent information may include an LM (not illustrated).

In an embodiment, in operation 523, the processor 520 may perform ambiguity verification on the utterance. The processor 520 may obtain an ambiguity index value from the text data and the intent information based on an ambiguity verification module (e.g., a first ambiguity verification module 531 and/or a second ambiguity verification module 532) including an LM (e.g., the general LM 533 and/or the task-oriented LM 534). The ambiguity index value may represent similarity between training data of the LM and text data (e.g., text data corresponding to an utterance).

In an embodiment, the processor 520 may use at least one LM (e.g., the general LM 533 and/or the task-oriented LM 534) when verifying ambiguity. The processor 520 may use one LM (e.g., the general LM 533) when verifying ambiguity. The processor 520 may use a plurality of LMs (e.g., the general LM 533 and the task-oriented LM 534) when verifying ambiguity. As described with reference to FIG. 5, the processor 520 may use an LM (not illustrated) when classifying utterance intent. Training data of the LM (not illustrated) used for utterance intent classification may be different from training data of the LM (e.g., the general LM 533 and/or the task-oriented LM 534) used for ambiguity verification. The processor 520 may detect a part that the utterance intent classification module fails to detect by using an LM (e.g., the general LM 533 and/or the task-oriented LM 534) for ambiguity verification, wherein the LM is trained based on different training data (e.g., training data that is different from training data of an LM (not illustrated) used for utterance intent classification).

In an embodiment, the LM (e.g., the general LM 533 and the task-oriented LM 534) may express a characteristic of a language and may assign a probability value to a component (e.g., a letter, a morpheme, and a word) constituting the language. The LM may be modeled based on a neural network. The processor 520 may obtain high verification performance with a small number of pieces of training data and may increase training speed by using the ambiguity verification module including the LM compared to a case in which a verification module (e.g., a verification module including a predefined allow list and/or a deny list) that does not include an LM is used. The processor 520 may not need to learn a list and may require training data of which the volume is less than the volume of list data. The processor 520 may have better performance in text matching than a method of using a predefined list. The LM may measure similarity between input data and training data within a structural range, a semantic range, a grammatical range, and/or an expressive range of training data used for training the LM.

In an embodiment, based on the training data of the LM, the LM of FIG. 6 may be divided into the general LM 533 and the task-oriented LM 534. The general LM 533 may be trained based on an utterance collected by crawling data. The training data of the general LM 533 may be based on various utterances including a general declarative sentence unlike a typical command (e.g., a task-oriented utterance) for a voice assistant. The processor 520 may detect a chit-chat utterance based on the general LM 533. The processor 520 may use the general LM 533 instead of an LM trained based on a dialogue (e.g., an open domain dialogue) used by a chatbot. The task-oriented LM 534 may be trained based on a task-oriented utterance. The task-oriented utterance may be based on a dialogue (e.g., a task-oriented dialogue) for an operation (or a function) that a user desires to execute using a device. For example, the general LM 533 may determine that an utterance "Let me hear your voice" is similar to training data of the general LM 533. The processor 520 may output an ambiguity index value that is close to a threshold (e.g., a threshold for determining ambiguity) for the utterance "Let me hear your voice" based on the general LM 533. For example, the task-oriented LM 534 may determine that an utterance "Tell me the weather" is similar to training data of the task-oriented LM 534. Based on the task-oriented LM 534, the processor 520 may output an ambiguity index value that is close to a threshold (e.g., a threshold for determining ambiguity) for the utterance "Tell me the weather".

In an embodiment, the ambiguity index value may be an output value based on a probability value, a perplexity value, and/or an uncertainty value based on the LM. The ambiguity index value may represent similarity between training data of an LM and an utterance. Only one evaluation index (e.g., a probability value, a perplexity value, and an uncertainty value) of the ambiguity index value may be used. Multiple evaluation indexes of the ambiguity index value may be used in parallel. A method of using multiple evaluation indexes in parallel may include a method of outputting an index value exceeding a threshold among a plurality of evaluation indexes. The method of using multiple evaluation indexes in parallel may include a method of outputting all index values exceeding a threshold when all evaluation indexes exceed the threshold. The method of using multiple evaluation indexes in parallel may include a method of normalizing and accumulating the plurality of evaluation indexes. The method of using multiple evaluation indexes in parallel may include a method of outputting a weighted sum of the plurality of evaluation indexes. For example, an output ambiguity index value obtained by a weighted sum of the plurality of evaluation indexes for input text x may be calculated by Equation 1.

$$\text{verification}(x) = a1 * \text{probability}(x) + a2 * \text{perplexity}(x) + a3 * \text{uncertainty}(x) \quad \text{[Equation 1]}$$

In Equation 1, a1, a2, and a3 may be set constants (or weights) and may be derived through training data. Equation 1 shown above is an example for understanding, is not limited thereto, and may be modified, applied, or expand in various ways.

In an embodiment, when the ambiguity index value is greater than a threshold, the processor 520 may determine that the input text x implies an ambiguous meaning (e.g., the input text x is similar to training data of the LM). The ambiguity index value may include a value greater than 0 and less than 1. The evaluation index value may include a value greater than 0 and less than 1.

In an embodiment, a probability value that is an evaluation index of the ambiguity index value may represent the probability for an output of the LM. When the probability value is relatively high, it may be determined that similarity between training data of the LM and input data (e.g., an utterance) is relatively high.

In an embodiment, a perplexity value that is an evaluation index of the ambiguity index value may be a value representing how new the input data is compared to the training data of the LM. For example, for an LM trained with news domain data, an utterance "Tune in to SBS" may have a perplexity value that is close to 0 and an utterance "Let's go skiing" may have a perplexity value that is close to 1. As the perplexity value decreases, the utterance may be substantially similar to the probability distribution of the LM. The perplexity value may be calculated by Equation 2.

$$PP(p) := 2^{H(p)} = 2^{-\sum_x p(x) \log_2 p(x)} = \prod_x p(x)^{-p(x)} \quad \text{[Equation 2]}$$

In Equation 2, H(p) may be entropy of the probability distribution. Equation 2 is only an example for understanding, is not limited thereto, and may be modified, applied, and expand in various ways. As the perplexity value decreases, it may be determined that training data of the LM and input data (e.g., an utterance) have relatively high similarity.

In an embodiment, an uncertainty value that is an evaluation index of an ambiguity index value may represent the degree of uncertainty for an output of an LM when data that is different from training data of the LM is input. For example, for an LM trained with weather domain data, the utterance "Make a phone call" may correspond to an uncertainty value that is close to 1. When the uncertainty value is relatively low, similarity between input data (e.g., an utterance) and training data of the LM may be relatively high.

In an embodiment, the processor 520 may output the ambiguity index value by assigning a weight to an evaluation index (e.g., a probability value, a perplexity value, and/or an uncertainty value). The processor 520 may determine that when at least one of ambiguity index values output by an ambiguity verification module (e.g., the first ambiguity verification module 531 and/or the second ambiguity verification module 532) exceeds a threshold, an utterance (or text corresponding to the utterance) implies ambiguity. The processor 520 may obtain intent information again when the ambiguity index value is greater than the threshold.

In an embodiment, in operation 524, the processor 520 may perform reclassification of utterance intent. The processor 520 may obtain at least one piece of second intent information corresponding to the user utterance. For example, the processor 520 may obtain at least one piece of intent information based on an n-best algorithm. For example, the processor 520 may perform reclassification of utterance intent except for the first intent information. Operation 524 may be omitted. When the processor 520 determines that the utterance implies ambiguity, in operation 525, the processor 520 may select different pieces of intent information (e.g., intent information candidates which are different from the first intent information) obtained when performing intent classification of operation 522.

In an embodiment, the n-best algorithm may output not only intent information corresponding to an utterance with the greatest probability but also top n pieces of intent information on the probability distribution corresponding to the utterance. For example, for the utterance "Tell me fine dust", intent information (e.g., intent information corresponding to the utterance with the greatest probability) including information on the weather as well as intent information (e.g., intent information possibly corresponding to the utterance) including an action related to an air purifier may be obtained. The at least one piece of second intent information may include the first intent information obtained in operation 522.

In an embodiment, the processor 520 may perform reclassification of utterance intent except for the first intent information. The at least one piece of second intent information may be different from the first intent information obtained in operation 522. A method of performing reclassification of utterance intent except for the first intent information may reclassify utterance intent even in the case where the first intent information (e.g., the intent information corresponding to the utterance with the greatest probability) is dominantly superior to the at least one piece of second intent information (e.g., the intent information possibly corresponding to the utterance). For example, when the correspondence probability of the first intent information and the at least one piece of second intent information (e.g., the at least one piece of second intent information including third intent information, fourth intent information, and fifth intent information) is the first intent information:the third intent information:the fourth intent information:the fifth intent information=90:4:3:3, the distribution of the correspondence probability among the at least one piece of second intent information may be different from the distribution of existing correspondence probability, except for the first intent information that is dominantly superior. For example, the correspondence probability except for the first intent information that is dominant superior may be the third intent information:the fourth intent information:the fifth intent information=80:10:10. For example, the correspondence probability except for the first intent information that is dominantly superior may be the third intent information: the fourth intent information:the fifth intent information=41:39:20. By performing reclassification of utterance intent except for the first intent information, intent information that is dominantly superior among the at least one piece of second intent information may be determined.

In an embodiment, in operation 525, the processor 520 may perform selection of utterance intent. The processor 520 may provide a response to a user using selected intent information from the at least one piece of second intent information (e.g., the first intent information and/or the second intent information). The processor 520 may provide a response to a user using the selected intent information from the at least one piece of second intent information (e.g., the first intent information and/or the second intent information) based on user history or an external database. The processor 520 may also provide a response to a user using intent information obtained by selection of the user from the at least one piece of second intent information (e.g., the first intent information and/or the second intent information).

In an embodiment, the processor 520 may select intent information based on utterance history of the user and/or a personalized LM. For example, when a user has frequently played the song "The Word I Love You" by the singer, Dongryul Kim, or the user's frequency of use (e.g., frequency of use of an application using an utterance) of a music application is higher than other users, intent information corresponding to the utterance "Let me hear the word I love you" including ambiguity may include information on music playback. The processor 520 may select intent information using a result obtained by searching, in an external database (e.g., a search engine), for a named entity (e.g., a predefined named entity, such as a person, a company, a place, time, and a unit) extracted from an utterance. For example, when the song "The Word I Love You" by Dongryul Kim becomes popular again online, intent information including information on music playback may have higher priority than other intent information. The processor 520 may use intent information obtained as a result of informing (e.g., selection by the user) the user that the utterance includes ambiguity. The method of informing a user of ambiguity of an utterance may include a method of informing of existence of ambiguity of an utterance. The method of informing a user of ambiguity of an utterance may include a method of informing of user intent (e.g., the first intent information) as the utterance including ambiguity is interpreted and determined.

Figure 7A:
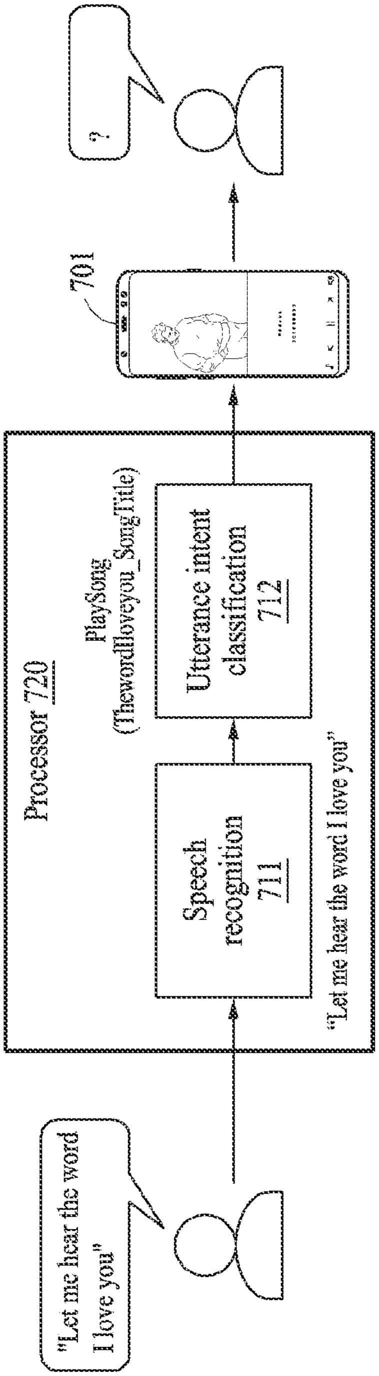
FIGS. 7A and 7B are examples of an operation of an electronic device to process a user utterance according to an embodiment.
Figure 7B:
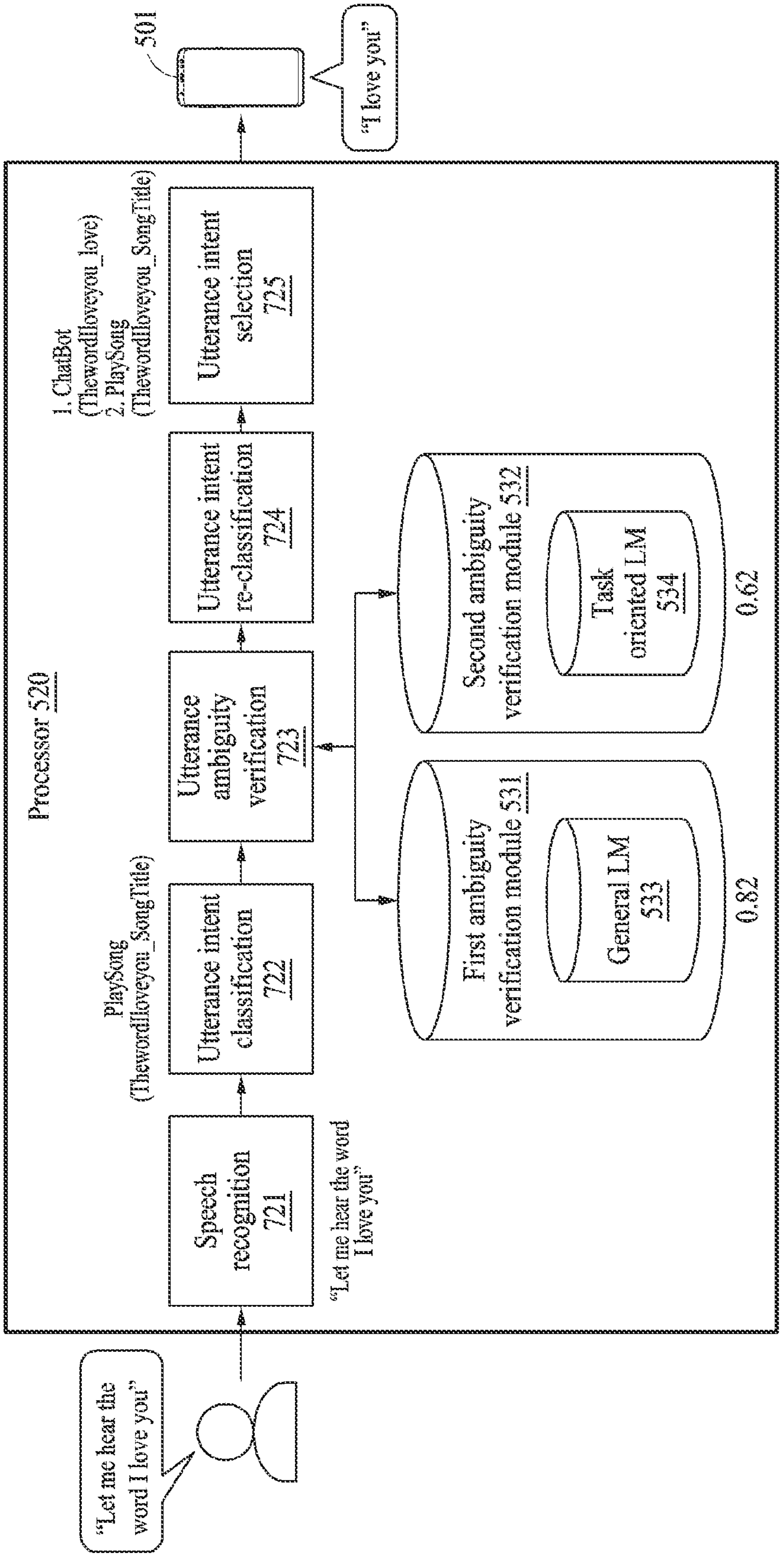

FIGS. 7A and 7B are examples of an operation of an electronic device to process a user utterance according to an embodiment.

Referring to FIG. 7A, an electronic device 701 in an embodiment may receive an utterance (e.g., "Let me hear the word I love you"). The utterance may imply an ambiguous meaning. The utterance (e.g., "Let me hear the word I love you") may be a task-oriented utterance that implies a request to play a song, "The Word I Love You". The utterance (e.g., "Let me hear the word I love you") may be a chit-chat utterance that implies a request to a chatbot to say "I love you". In operation 711, a processor 720 of the electronic device 701 may perform speech recognition. The processor 720 may convert data (e.g., a voice signal) related to a voice input (e.g., "Let me hear the word I love you") received from the electronic device 701 into text data. In operation 712, the processor 720 may perform utterance intent classification. The processor 720 of the electronic device 701 may obtain intent information (e.g., PlaySong(Thewordlloveyou_SongTitle) including information on music playback corresponding to the utterance "Let me hear the word I love you". The electronic device 701 may play the song "The Word I Love You" based on the intent information (e.g., PlaySong(Thewordlloveyou_SongTitle). A user who uttered to a chatbot to hear "I love you" may have dissatisfaction with the operation of the electronic device 701.

Referring to FIG. 7B, the electronic device 501 (e.g., the electronic device 101 of FIG. 1 and the electronic device 201 of FIG. 2) in an embodiment may verify ambiguity of the utterance (e.g., "Let me hear the word I love you") based on an LM (e.g., the general LM 533). It may be understood that operations 721 to 725 may be performed by the processor 520 (e.g., the processor 120 of FIG. 1 and the processor 203 of FIG. 2) of the electronic device 501. Operations to be described hereinafter may be sequentially performed but not necessarily. For example, the order of the operations may change, and at least two of the operations may be performed in parallel.

In an embodiment, in operation 721, the processor 520 may perform speech recognition. The processor 520 may convert data (e.g., a voice signal) related to a voice input (e.g., "Let me hear the word I love you") received from the electronic device 501 into text data.

In an embodiment, in operation 722, the processor 520 may perform intent classification on an utterance (e.g., a user utterance converted into text data). The processor 520 may obtain first intent information (e.g., PlaySong(Thewordlloveyou_SongTitle)) corresponding to the user utterance.

In an embodiment, in operation 723, the processor 520 may perform ambiguity verification on the utterance. The processor 520 may obtain an ambiguity index value (e.g., 0.82 output by the first ambiguity verification module 531) from the text data and the intent information, based on an ambiguity verification module (e.g., the first ambiguity verification module 531) including an LM (e.g., the general LM 533). The ambiguity index value may represent similarity between training data of the LM and text data (e.g., text data corresponding to an utterance). The processor 520 may determine that the utterance implies ambiguity because the ambiguity index value (e.g., 0.82 output by the first ambiguity verification module 531) is greater than a threshold (e.g., 0.7 but is not limited thereto). As described with reference to FIG. 5, the processor 520 may use an LM (not illustrated) when classifying utterance intent. Training data of the LM (not illustrated) used for utterance intent classification may be different from training data of the LM (e.g., the general LM 533) used for ambiguity verification. The processor 520 may detect a part that the utterance intent classification module fails to detect by using an LM (e.g., the general LM 533) for ambiguity verification, wherein the LM is trained based on different training data (e.g., training data that is different from training data of an LM (not illustrated) used for utterance intent classification).

In an embodiment, in operation 724, the processor 520 may perform reclassification of utterance intent. The processor 520 may obtain at least one piece of second intent information (e.g., ChatBot(ThewordIloveyou_love), PlaySong(ThewordIloveyou_SongTitle)) corresponding to the user utterance. Operation 724 may be omitted. When the processor 520 determines that the utterance implies ambiguity, in operation 725, the processor 520 may select different pieces of intent information (e.g., intent information candidates which are different from the first intent information) obtained when performing intent classification of operation 722.

In an embodiment, in operation 725, the processor 520 may perform selection of utterance intent. The processor 520 may provide a response to a user using selected intent information (e.g., ChatBot(Thewordlloveyou_love)) from the at least one piece of second intent information (e.g., the first intent information and/or the second intent information). The electronic device 501 may utter "I love you" to the user based on the selected intent information (e.g., ChatBot (Thewordlloveyou_love)).

Figure 8A:
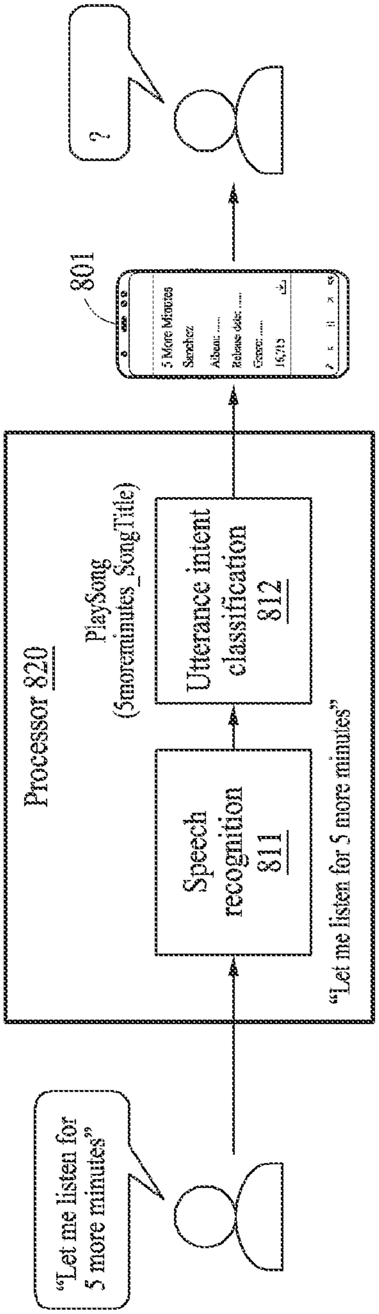
FIGS. 8A and 8B are examples of an operation of an electronic device to process a user utterance according to an embodiment.
Figure 8B:
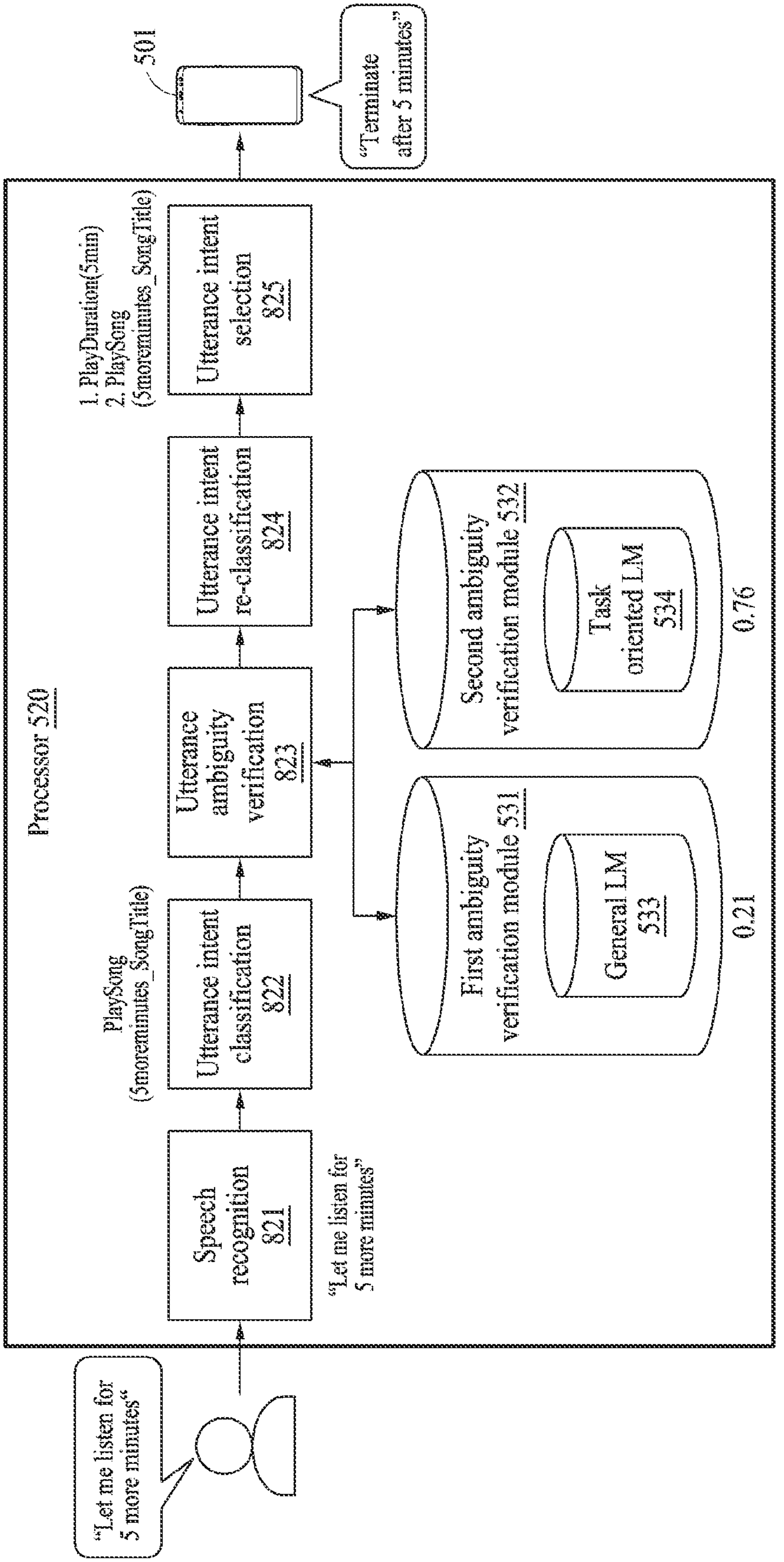

FIGS. 8A and 8B are examples of an operation of an electronic device to process a user utterance according to an embodiment.

Referring to FIG. 8A, an electronic device 801 in an embodiment may receive an utterance (e.g., "Let me listen for 5 more minutes"). The utterance may imply an ambiguous meaning. The utterance (e.g., "Let me listen for 5 more minutes") may be a task-oriented utterance implying a meaning that play the song, "5 more minutes". The utterance (e.g., "Let me listen for 5 more minutes") may be a task-oriented utterance implying a meaning of play the currently playing song for 5 more minutes. In operation 811, a processor 820 of the electronic device 801 may perform speech recognition. The processor 820 may convert data (e.g., a voice signal) related to a voice input (e.g., "Let me listen for 5 more minutes") received from the electronic device 801 into text data. In operation 812, the processor 820 may perform utterance intent classification. The processor 820 of the electronic device 801 may obtain intent information (e.g., PlaySong(5moreminutes_SongTitle)) including information of a song title in response to the utterance "Let me listen for 5 more minutes". The electronic device 801 may play the song "5 more minutes" based on the intent information (e.g., PlaySong(5moreminutes_SongTitle)). The user who uttered to request to play the currently playing song for 5 more minutes may have dissatisfaction with the operation of the electronic device 801.

Referring to FIG. 8B, the electronic device 501 (e.g., the electronic device 101 of FIG. 1 and the electronic device 201 of FIG. 2) in an embodiment may verify ambiguity of the utterance (e.g., "Let me listen for 5 more minutes") based on an LM (e.g., the general LM 533). It may be understood that operations 821 to 825 may be performed by the processor 520 (e.g., the processor 120 of FIG. 1 and the processor 203 of FIG. 2) of the electronic device 501. Operations to be described hereinafter may be sequentially performed but not necessarily. For example, the order of the operations may change, and at least two of the operations may be performed in parallel.

In an embodiment, in operation 821, the processor 520 may perform speech recognition. The processor 520 may convert data (e.g., a voice signal) related to a voice input (e.g., "Let me listen for 5 more minutes") received from the electronic device 501 into text data.

In an embodiment, in operation 822, the processor 520 may perform intent classification on an utterance (e.g., a user utterance converted into text data). The processor 520 may obtain first intent information (e.g., PlaySong(5more-minutes_SongTitle)) corresponding to the user utterance.

In an embodiment, in operation 823, the processor 520 may perform ambiguity verification on the utterance. The processor 520 may obtain a plurality of ambiguity index values (e.g., 0.21 output by the first ambiguity verification module 531 and 0.76 output by the second ambiguity verification module 532) from the text data and the intent information based on a plurality of ambiguity verification modules (e.g., the first ambiguity verification module 531 and the second ambiguity verification module 532) including an LM (e.g., the general LM 533 and the task-oriented LM 534). The ambiguity index value may represent similarity between training data of each LM and text data (e.g., text data corresponding to the utterance). The processor 520 may determine that the utterance implies ambiguity because the ambiguity index value (e.g., 0.76 output by the second ambiguity verification module 532) is greater than a threshold (e.g., 0.7).

In an embodiment, in operation 824, the processor 520 may perform reclassification of utterance intent. The processor 520 may obtain at least one piece of second intent information (e.g., PlayDuration(5 min), PlaySong(5more-minutes_SongTitle)) corresponding to the user utterance. Operation 824 may be omitted. When the processor 520 determines that the utterance implies ambiguity, in operation 825, the processor 520 may select different pieces of intent information (e.g., intent information candidates which are different from the first intent information) obtained when performing intent classification of operation 822.

In an embodiment, in operation 825, the processor 520 may perform selection of utterance intent. The processor 520 may provide a response to a user using selected intent information (e.g., PlayDuration(5 min)) from the at least one piece of second intent information (e.g., the first intent information and/or the second intent information). The electronic device 501 may play the currently playing song for 5 more minutes and may terminate based on the selected intent information (e.g., PlayDuration(5 min))

Figure 9:
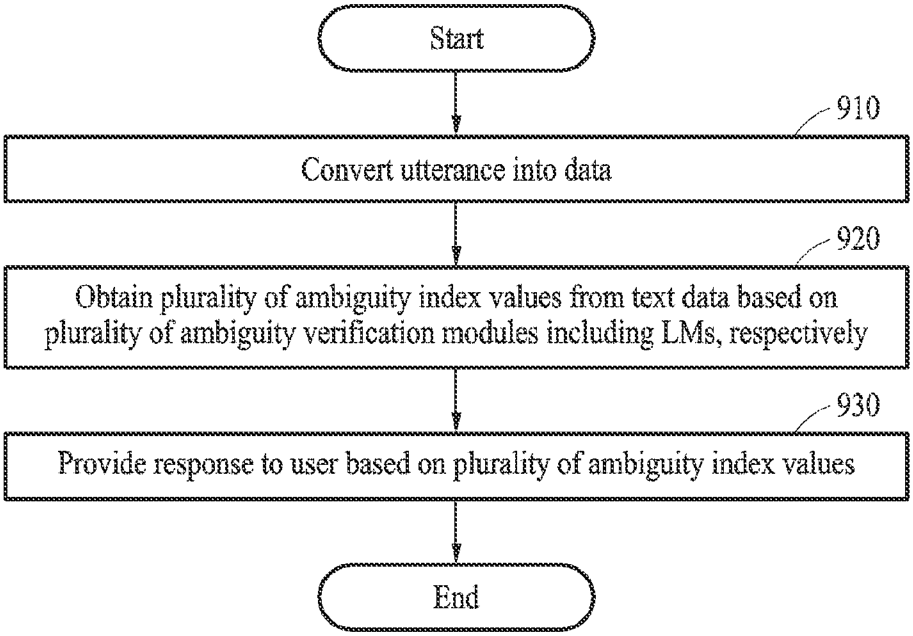
FIG. 9 is a flowchart illustrating an operating method of an electronic device according to an embodiment.

FIG. 9 is a flowchart illustrating an operating method of an electronic device according to an embodiment.

Operations 910 to 930 may be sequentially performed but not necessarily. For example, operations 910 to 930 may be performed in different orders, and at least two operations may be performed in parallel.

In operation 910, a processor (e.g., the processor 520 of FIG. 6) may convert an utterance into text data.

In operation 920, the processor 520 may obtain a plurality of ambiguity index values from the text data based on a plurality of ambiguity verification modules including an LM.

In operation 930, the processor 520 may provide a response to a user based on the plurality of ambiguity index values.

Figure 10:
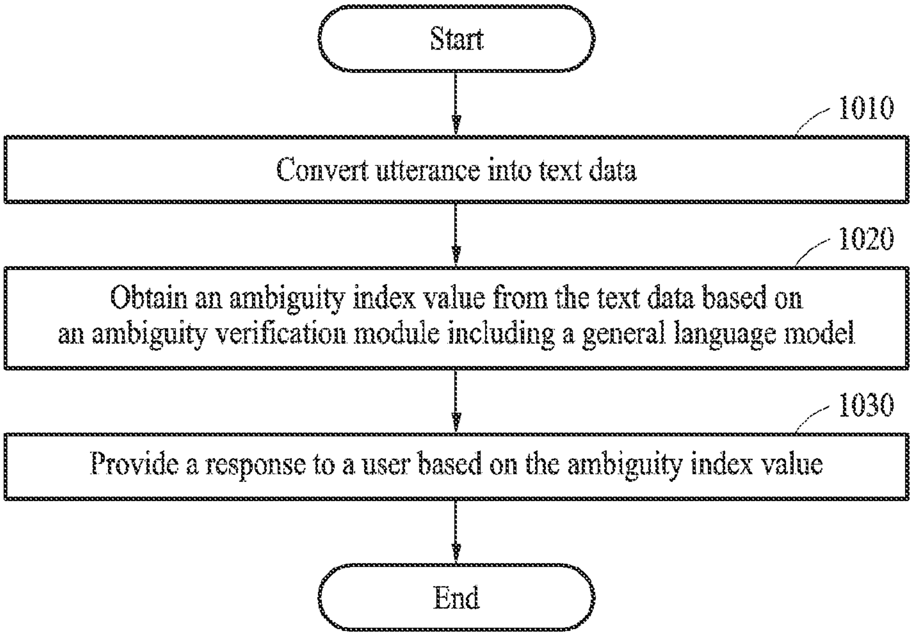
FIG. 10 is a flowchart illustrating an operating method of an electronic device according to an embodiment.

FIG. 10 is a flowchart illustrating an operating method of an electronic device according to an embodiment.

Operations 1010 to 1030 may be sequentially performed but not necessarily. For example, operations 1010 to 1030 may be performed in different orders, and at least two operations may be performed in parallel.

In operation 1010, a processor (e.g., the processor 520 of FIG. 6) may convert an utterance into text data. The utterance can be received as audio data captured by a microphone.

In operation 1020, the processor 520 may obtain an ambiguity index value from the text data based on an ambiguity verification modules including a general language model, such as general LM 533 of FIG. 6.

In operation 1030, the processor 520 may provide a response to a user based on the ambiguity index value.

An electronic device (e.g., the electronic device 101 of FIG. 1, the electronic device 201 of FIG. 2, the electronic device 501 of FIGS. 5 and 6) in an embodiment may include a memory (e.g., the memory 130 of FIG. 1, the memory 207 of FIG. 2, and the processor 520 of FIG. 6) including instructions, and a processor (e.g., the processor 120 of FIG. 1, the processor 203 of FIG. 2, and the processor 520 of FIG. 6) electrically connected to the memory and configured to execute the instructions. When the instructions are executed by the processor, the processor may be configured to convert an utterance into text data. The processor may be configured to obtain a plurality of ambiguity index values from the text data based on each of a plurality of ambiguity verification modules including an LM. The processor may be configured to provide a response to the user based on the plurality of ambiguity index values.

In an embodiment, the plurality of ambiguity verification modules may include a first ambiguity verification module including a general LM. The plurality of ambiguity verification modules may include a second ambiguity verification module including an LM that is trained based on a task-oriented utterance, such as task-oriented LM 534.

In an embodiment, the ambiguity index value may be obtained based on at least one of a probability value, a perplexity value, and/or an uncertainty value based on an LM.

In an embodiment, the processor may be configured to obtain first intent information corresponding to the utterance based on the text data. The plurality of ambiguity index values may be obtained as a result of inputting the first intent information and the text data to each of the plurality of ambiguity verification modules.

In an embodiment, the processor may be configured to, when all of the plurality of ambiguity index values are less than a threshold, provide a response to a user based on the first intent information corresponding to the utterance. When at least one of the plurality of ambiguity index values is greater than the threshold, the processor may be configured to provide a response to the user based on at least one piece of second intent information corresponding to the utterance.

In an embodiment, the at least one piece of second intent information may be obtained based on an n-best algorithm.

In an embodiment, the at least one piece of second intent information may be obtained as the processor performs intent classification except for the first intent information.

In an embodiment, the processor may be configured to provide a response to the user by using selected intent information from the second intent information based on a user history or an external database.

In an embodiment, the processor may be configured to provide a response to the user by using intent information obtained by selection of the user from the second intent information.

A method of operating an electronic device (e.g., the electronic device 101 of FIG. 1, the electronic device 201 of FIG. 2, or the electronic device 501 of FIGS. 5 and 6) in an embodiment may include converting an utterance into text data. The method may include obtaining a plurality of ambiguity index values from the text data based on each of a plurality of ambiguity verification modules including LMs. The method may include providing a response to a user based on the plurality of ambiguity index values.

In an embodiment, the plurality of ambiguity verification modules may include a first ambiguity verification module including a general LM. The plurality of ambiguity verification modules may include a second ambiguity verification module including an LM that is trained based on a task-oriented utterance.

In an embodiment, the ambiguity index value may be obtained based on at least one of a probability value, a perplexity value, and/or an uncertainty value based on a language model.

In an embodiment, the method may further include obtaining first intent information corresponding to the utterance based on the text data. The plurality of ambiguity index values may be obtained as a result of inputting the first intent information and the text data to each of the plurality of ambiguity verification modules.

In an embodiment, the providing may include, when all of the plurality of ambiguity index values are less than a threshold, providing a response to a user based on the first intent information corresponding to the utterance, and when at least one of the plurality of ambiguity index values is greater than the threshold, providing a response to the user based on at least one piece of second intent information corresponding to the utterance.

In an embodiment, the at least one piece of second intent information may be obtained based on an n-best algorithm.

In an embodiment, the at least one piece of second intent information may be obtained by performing intent classification except for the first intent information.

In an embodiment, the providing of a response to a user based on at least one piece of second intent information may include providing a response to the user by using selected intent information from the second intent information based on a user history or an external database.

In an embodiment, the providing of a response to a user based on at least one piece of second intent information may include providing a response to the user by using intent information obtained by selection of the user from the second intent information.

An electronic device (e.g., the electronic device 101 of FIG. 1, the electronic device 201 of FIG. 2, or the electronic device 501 of FIGS. 5 and 6) in an embodiment may include a memory including instructions and a processor electrically connected to the memory and configured to execute the instructions. When the instructions are executed by the processor, the processor may be configured to convert an utterance into text data. The processor may be configured to obtain an ambiguity index value from the text data based on an ambiguity verification module including a general LM. The processor may be configured to provide a response to a user based on the ambiguity index value.

In an embodiment, the ambiguity index value may be obtained based on at least one of a probability value, a perplexity value, or an uncertainty value based on a language model.

The electronic device according to an embodiment may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be understood that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “A, B, or C,” each of which may include any one of the items listed together in the corresponding one of the phrases, or all possible combinations thereof. Terms such as “first”, “second”, or “first” or “second” may simply be used to distinguish the component from other components in question, and may refer to components in other aspects (e.g., importance or order) is not limited. It is to be understood that if an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., by wire), wirelessly, or via a third element.

As used in connection with an embodiment of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to one embodiment, the module may be implemented in a form of an application-specific integrated circuit (ASIC).

An embodiment as set forth herein may be implemented as software (e.g., the program) including one or more instructions that are stored in a storage medium (e.g., an internal memory or an external memory) that is readable by the machine (e.g., the electronic device). For example, a processor (e.g., the processor) of the machine (e.g., the electronic device) may invoke at least one of the one or more instructions stored in the storage medium and may execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same manner or in a similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

memory comprising instructions;

a microphone; and at least one processor comprising processing circuitry, wherein, the instructions, when executed by the at least one processor individually or collectively, cause the electronic device to:

receive an utterance through the microphone;

convert the utterance into text data;

obtain first intent information corresponding to the utterance based on the text data;

obtain a first ambiguity index value for the first intent information using a first language model comprising a general language model;

obtain a second ambiguity index value for the first intent information using a second language model different from the first language model, wherein the second language model comprises a task-oriented language model;

provide a response to a user using the first intent information corresponding to the utterance, based on the first ambiguity index value being less than a first threshold and the second ambiguity index value being less than a second threshold; and provide the response to the user using at least one piece of second intent information corresponding to the utterance, based on the first ambiguity index value being greater than the first threshold or the second ambiguity index value being greater than the second threshold.

2. The electronic device of claim 1, wherein:

the first language model is trained based on dialogue data; and the second language model is trained based on a task-oriented utterance.

3. The electronic device of claim 1, wherein the first ambiguity index value is obtained based on at least one of a probability value, a perplexity value, or an uncertainty value based on the first language model.

4. The electronic device of claim 1, wherein the first and second ambiguity index values are obtained as a result of inputting the first intent information and the text data to each of the first and second language models.

5. The electronic device of claim 1, wherein the at least one piece of second intent information is obtained based on an n-best algorithm.

6. The electronic device of claim 1, wherein the at least one piece of second intent information is obtained as the processor performs intent classification except for the first intent information.

7. The electronic device of claim 1, wherein the instructions, when executed by the at least one processor individually or collectively, further cause the electronic device to provide the response to the user by using selected intent information from the at least one piece of second intent information based on a user history or an external database.

8. The electronic device of claim 1, wherein the instructions, when executed by the at least one processor individually or collectively, further cause the electronic device to provide the response to the user by using intent information obtained by selection of the user from the at least one piece of second intent information.

9. A method of operating an electronic device, the method comprising:

receiving an utterance through a microphone;

converting an utterance into text data;

obtaining first intent information corresponding to the utterance based on the text data;

obtaining a first ambiguity index value for the first intent information using a first language model comprising a general language model;

obtaining a second ambiguity index value for the first intent information using a second language model different from the first language model, wherein the second language model comprises a task-oriented language model;

providing a response to a user using the first intent information corresponding to the utterance, based on the first ambiguity index value being less than a first threshold and the second ambiguity index value being less than a second threshold; and providing the response to the user using at least one piece of second intent information corresponding to the utterance, based on the first ambiguity index value being greater than the first threshold or the second ambiguity index value being greater than the second threshold.

10. The method of operating the electronic device of claim 9, wherein:

the first language model is trained based on dialogue data; and the second language model is trained based on a task-oriented utterance.

11. The method of operating the electronic device of claim 9, wherein the first ambiguity index value is obtained based on at least one of a probability value, a perplexity value, or an uncertainty value based on the first language model.

12. The method of operating the electronic device of claim 9, wherein the first and second ambiguity index values are obtained as a result of inputting the first intent information and the text data to each of the first and second language models.

13. The method of operating the electronic device of claim 9, wherein the at least one piece of second intent information is obtained based on an n-best algorithm.

14. The method of operating the electronic device of claim 9, wherein the at least one piece of second intent information is obtained by performing intent classification except for the first intent information.

15. The method of operating the electronic device of claim 9, wherein providing of the response to the user based on at least one piece of second intent information comprises:

providing the response to the user by using selected intent information from the at least one piece of second intent information based on a user history or an external database.

16. The method of operating the electronic device of claim 9, wherein providing the response to the user based on at least one piece of second intent information comprises:

providing the response to the user by using intent information obtained by selection of the user from the at least one piece of second intent information.

* * * * *